United States Patent
Andersen et al.

(10) Patent No.: US 10,325,135 B2
(45) Date of Patent: Jun. 18, 2019

(54) METHOD FOR FINGERPRINT ENROLLMENT

(71) Applicant: Fingerprint Cards AB, Göteborg (SE)

(72) Inventors: Klaus Scheldrup Andersen, Hvidovre (DK); Troels Bjerre, Valby (DK)

(73) Assignee: Fingerprint Cards AB, Gothenburg (SE)

( * ) Notice: Subject to any disclaimer, the term of this patent is extended or adjusted under 35 U.S.C. 154(b) by 99 days.

(21) Appl. No.: 15/807,006

(22) Filed: Nov. 8, 2017

(65) Prior Publication Data

US 2018/0137332 A1    May 17, 2018

(30) Foreign Application Priority Data

Nov. 15, 2016 (SE) ...................................... 1651492

(51) Int. Cl.
*G06K 9/00* (2006.01)
(52) U.S. Cl.
CPC ....... *G06K 9/00026* (2013.01); *G06K 9/0002* (2013.01); *G06K 9/00087* (2013.01); *G06K 9/00926* (2013.01)
(58) Field of Classification Search
CPC .......... G06K 9/00026; G06K 9/00926; G06K 9/00087
See application file for complete search history.

(56) References Cited

U.S. PATENT DOCUMENTS

| | | | |
|---|---|---|---|
| 6,795,569 B1 | 9/2004 | Setlak | |
| 7,064,743 B2 * | 6/2006 | Nishikawa | G06F 3/03547 345/157 |
| 9,135,494 B2 | 9/2015 | Boshra et al. | |
| 9,268,991 B2 | 2/2016 | Russo et al. | |
| 9,477,868 B1 * | 10/2016 | Carling | G06K 9/00013 |
| 2005/0238212 A1 * | 10/2005 | Du | G06K 9/00026 382/124 |
| 2006/0078176 A1 * | 4/2006 | Abiko | G06F 3/03547 382/124 |
| 2006/0202028 A1 * | 9/2006 | Rowe | A61B 5/1171 235/382 |
| 2010/0046810 A1 * | 2/2010 | Yamada | G06K 9/00026 382/124 |

(Continued)

FOREIGN PATENT DOCUMENTS

| | | |
|---|---|---|
| WO | 2005008568 A1 | 1/2005 |
| WO | 2014004210 A1 | 1/2014 |
| WO | 2016015034 A1 | 1/2016 |

OTHER PUBLICATIONS

Mathur, S. et al., "Methodology for partial fingerprint enrollment and authentication on mobile devices", 2016 International Conference on Biometrics (ICB), Halmstad, Jun. 13-16, 2016, pp. 1-8.

(Continued)

*Primary Examiner* — Samir A Ahmed
(74) *Attorney, Agent, or Firm* — RMCK Law Group, PLC

(57) ABSTRACT

The present invention relates to a method of enrolling a fingerprint of a user's finger using a fingerprint sensor, specifically allowing for an adaptability in a number of times the use's finger needs to touch/contact the fingerprint sensor for enrollment completion. The invention also relates to a corresponding electronic device and to a computer program product.

15 Claims, 5 Drawing Sheets

(56) References Cited

U.S. PATENT DOCUMENTS

| | | | |
|---|---|---|---|
| 2014/0218311 A1* | 8/2014 | Huang | G06K 9/00013 |
| | | | 345/173 |
| 2015/0074615 A1 | 3/2015 | Han et al. | |
| 2016/0026840 A1* | 1/2016 | Li | G06K 9/00013 |
| | | | 348/77 |
| 2016/0217310 A1 | 7/2016 | Shah et al. | |
| 2016/0260225 A1* | 9/2016 | Thornblom | G06K 9/00087 |

OTHER PUBLICATIONS

Swedish Search Report for Swedish Application No. 1651492-9 dated Jul. 7, 2017, 3 pages.

\* cited by examiner

METHOD FOR FINGERPRINT ENROLLMENT

CROSS REFERENCE TO RELATED APPLICATIONS

This application claims priority to Sweden Application No. 1651492-9, filed on Nov. 15, 2016, the disclosure of which is incorporated herein by reference in its entirety.

TECHNICAL FIELD

The present invention relates to a method of enrolling a fingerprint of a user's finger using a fingerprint sensor, specifically allowing for an adaptability in a number of times the user's finger needs to touch/contact the fingerprint sensor for enrollment completion. The invention also relates to a corresponding electronic device and to a computer program product.

BACKGROUND

The use of biometric techniques to identify and/or authenticate the identity of a user is increasing. Biometric techniques that are promoted for this use include voice, fingerprint, iris, vein pattern and other scans. Currently, the use of fingerprint sensors for capturing a fingerprint has shown to be specifically promising, for example due to its ease of integration with different types of electronic equipment, such as smartphones, tablets, wearables such as smart watches or any other type of electronic devices where personalized user interaction is advantageous.

Biometric systems applying fingerprint sensors for collecting biometric data relating to a user typically provide for collection of fingerprint information, and compare that information against a database of known fingerprints. For example, a set of known fingerprints for a user can be collected, and subsequently authorized by comparing fingerprint information for that user against known fingerprint information. This generally involves collecting fingerprints from the authorized user and enrolling those collected fingerprints in that database of known fingerprint information.

During a typical prior art enrollment process, the user is instructed to place his finger on or in the close vicinity of the fingerprint sensor for collection of a predetermined plurality of fingerprint images of the finger of the user, where the finger preferably is slightly repositioned for each of the acquired images. The user might be prompted to move around the finger either less or more between subsequent image captures.

The process of collecting fingerprints from an authorized user may in some situations be experienced as time consuming, specifically for a skilled user enrolling multiple fingers on multiple devices. An exemplary disclosure trying to overcome this problem is disclosed in WO2014004210. WO2014004210 specifically addresses issues in relation to explicit time spent by a user for enrolling a finger, by performing the enrollment process in the background. That is, a plurality of partial fingerprint images is over time acquired using a fingerprint sensor comprised with an electronic device, and subsequently combined for forming a fingerprint template.

Even though WO2014004210 shows an interesting approach to reducing the dedicated user time needed for enrolling a finger of a user, the solution proposed in WO2014004210 may in some situations introduce safety issues, since it may be problematic to ensure that the fingerprint sensor does not form the template based on multiple users or multiple fingers for the same user. Such a situation may for example occur in case the electronic device is used/shared by multiple users. Accordingly, there seems to be room for further improvement, both from a security and from a usability perspective, for allowing a possible reduction of dedicated user time needed for enrolling a finger.

SUMMARY

According to an aspect of the present invention, the above is at least partly alleviated by a method of enrolling a fingerprint of a user's finger, by means of an electronic device comprising a fingerprint sensor having an active area, the method comprising the steps of acquiring, from the fingerprint sensor, for each finger placement in a sequence of finger placements on the fingerprint sensor during an enrollment process, a fingerprint image of a portion of the fingerprint, estimating, based on the fingerprint images acquired for the finger placements in the sequence of finger placements, a total template coverage area, estimating, for each finger placement in said sequence of finger placements on said fingerprint sensor, a change in the total coverage area, estimating, based on the fingerprint images acquired for the finger placements in the sequence of finger placements, an indication of an overall finger displacement activity by the user within the active area of the fingerprint sensor, completing the enrollment process by forming a fingerprint template based on said acquired fingerprint images, wherein completion of the enrollment process is dependent on the overall finger displacement activity and the change in the total coverage area, and saving the fingerprint template together with an identifier for the fingerprint to thereby enrolling the fingerprint of the user's finger.

By means of the present disclosure, it is possible to, in some situations, reduce the number of times the user needs to e.g. touch/contact/arranged his finger adjacently to the fingerprint sensor for collecting a sufficient amount of information for forming a fingerprint template that in a successful manner may be used in a subsequent authentication process, wherein a dedicated user's time needed for enrolling the finger is reduced.

Specifically, the present disclosure will allow users to finish enrollment with as few touches as is necessary to acquire fingerprint data of a sufficient area of the user's finger. The described methodology relies on the estimation of changes in covered area and the mobility of the finger between subsequent touches to determine if the sufficient fingerprint area is covered and the enrollment can be finished/completed.

Accordingly, the present disclosure introduces adaptability to the enrollment process, where the behavior of the user during the enrollment process is explicitly taken into account. Accordingly, in case the user takes an "active approach" during the fingerprint enrollment process by "moving around his finger" (in a smart manner) to collect data relating to different (e.g. overlapping) portions of the finger, it will be possible to reduce the number of times needed for the user to contact the sensor for creating the fingerprint template.

For achieving such adaptability in relation to completion of the enrollment process, the present disclosure determines how the total coverage area changes as well as providing an indication of an overall finger displacement activity. For example, the enrollment process may be determined to be completed if the overall finger displacement activity is above a first threshold and the change in the total coverage area is below a second threshold. Thus, in case it is determined that the user activity/finger displacement activity is "high enough" (above the first threshold) and there no longer is any significant change in the total coverage area (below the second threshold), then the enrollment process may be determined to be complete, and the collected data may be used for forming the fingerprint template. The thresholds (i.e. the first and the second) may be fixed or may alternatively be dynamic, for example dependent on the user, such as based on previous information collected during enrollment of e.g. another finger of the same user.

Within the context of the present disclosure, the expression "fingerprint image" should be interpreted broadly and to include both a regular "visual image" of a fingerprint of a finger as well as a set of measurements (data) relating to the finger when acquired using the fingerprint sensor. During the enrollment process a plurality of fingerprint images are subsequently acquired and fused together, where the resulting information is used as an input for determining sets of fingerprint features.

In an embodiment of the present disclosure, the completion of the enrollment process is further dependent on at least one of a size and a shape of the active area of the sensor, possibly achieved by allowing the first and second threshold to be dependent on at least one of a size and a shape of the active area of the fingerprint sensor. In a possible implementation, an in comparison small sensor (small active sensor area) will require a user activity/finger displacement activity to be higher as compared to a fingerprint sensor having an in comparison larger active area (large sensor). This is related to the fact that the smaller sized sensor will capture a smaller area of the finger for each finger placement in the sequence of finger placements on the fingerprint sensor. Thus, to acquire a corresponding amount of data relating to the users finger, there will be a higher requirement on the user to move/displace his finger for each of the finger placements in the mentioned sequence, as compared to the case with the in comparison larger sized sensor. A corresponding requirement may be applicable in relation to differently shaped fingerprint sensors.

Preferably, the step of estimating the indication of an overall finger displacement activity by the user comprises the step of estimating a distance between centers of touch for two consecutively acquired fingerprint images in said sequence of finger placements on said fingerprint sensor. Accordingly, it may in some situations be possible to select a (possible) center point for the finger in one fingerprint image and compare the position of the selected center point within the subsequently acquired fingerprint image. It should however be understood that the selected center point may be an estimated center point for the finger (not necessarily being in the absolute center for the finger), as seen from a two-dimensional perspective. The selected center point may in some embodiment be related to a specific feature identified within the acquired fingerprint images.

In some situations it may additionally be desirable to allow the enrollment process to complete, even though the activity/the change in the total coverage area has not proceeded in accordance to the adaptable approach. Thus, in one embodiment it may additionally be desirable to allow the enrollment process to be completed also if the number of finger placements on the fingerprint sensor during the enrollment process is above a third threshold (e.g. a fixed number of times, such as 10-15 times).

According to another aspect of the present invention, there is provided an electronic device adapted for enrolling a fingerprint of a user's finger, the electronic device comprising a fingerprint sensor having an active area, and processing circuitry, wherein the processing circuitry is adapted to acquire, from the fingerprint sensor, for each finger placement in a sequence of finger placements on the fingerprint sensor during an enrollment process, a fingerprint image of a portion of the fingerprint, estimate, based on the fingerprint images acquired for the finger placements in the sequence of finger placements, a total template coverage area, estimate, for each finger placement in said sequence of finger placements on said fingerprint sensor, a change in the total coverage area, estimate, based on the fingerprint images acquired for the finger placements in the sequence of finger placements, an indication of an overall finger displacement activity by the user within the active area of the fingerprint sensor, complete the enrollment process by forming a fingerprint template based on said acquired fingerprint images, wherein completion of the enrollment process is dependent on the overall finger displacement activity and the change in the total coverage area, and save the fingerprint template together with an identifier for the fingerprint to thereby enrolling the fingerprint of the user's finger. This aspect of the invention provides similar advantages as discussed above in relation to the previous aspect of the invention.

The expression "processing circuitry" as used above should be understood to include any type of computing device, such as an ASIC, a microprocessor, etc. It should also be understood that the actual implementation of such a processing circuitry may be divided between more than a single device/circuit.

It should be understood that the fingerprint sensor preferably is a fingerprint touch sensor; however the invention may also be implemented using e.g. a swipe fingerprint sensor. The fingerprint sensor may be implemented using any kind of current or future fingerprint sensing principle, including for example capacitive, optical, or thermal sensing technology. However, at present capacitive sensing is most preferred. Both one and two-dimensional sensors are possible and within the scope of the invention.

In accordance to a still further aspect of the invention there is provided a computer program product comprising a non-transitory computer readable medium having stored thereon computer program means for operating an electronic device adapted for enrolling a fingerprint of a user's finger, the electronic device comprising, fingerprint sensor having an active area, and processing circuitry, wherein the computer program product comprises, code for acquiring, from the fingerprint sensor, for each finger placement in a sequence of finger placements on the fingerprint sensor during an enrollment process, a fingerprint image of a portion of the fingerprint, code for estimating, based on the fingerprint images acquired for the finger placements in the sequence of finger placements, a total template coverage area, code for estimating, for each finger placement in said sequence of finger placements on said fingerprint sensor, a change in the total coverage area, code for estimating, based on the fingerprint images acquired for the finger placements in the sequence of finger placements, an indication of an overall finger displacement activity by the user within the active area of the fingerprint sensor, code for completing the enrollment process by forming a fingerprint template based on said acquired fingerprint images, wherein completion of the enrollment process is dependent on the overall finger displacement activity and the change in the total coverage area, and code for saving the fingerprint template together with an identifier for the fingerprint to thereby enrolling the fingerprint of the user's finger. Also this aspect of the invention provides similar advantages as discussed above in relation to the previous aspects of the invention.

Further features of, and advantages with, the present invention will become apparent when studying the appended claims and the following description. The skilled addressee realize that different features of the present invention may be combined to create embodiments other than those described in the following, without departing from the scope of the present invention.

BRIEF DESCRIPTION OF THE DRAWINGS

The various aspects of the invention, including its particular features and advantages, will be readily understood from the following detailed description and the accompanying drawings, in which.

DETAILED DESCRIPTION

Figure 1:
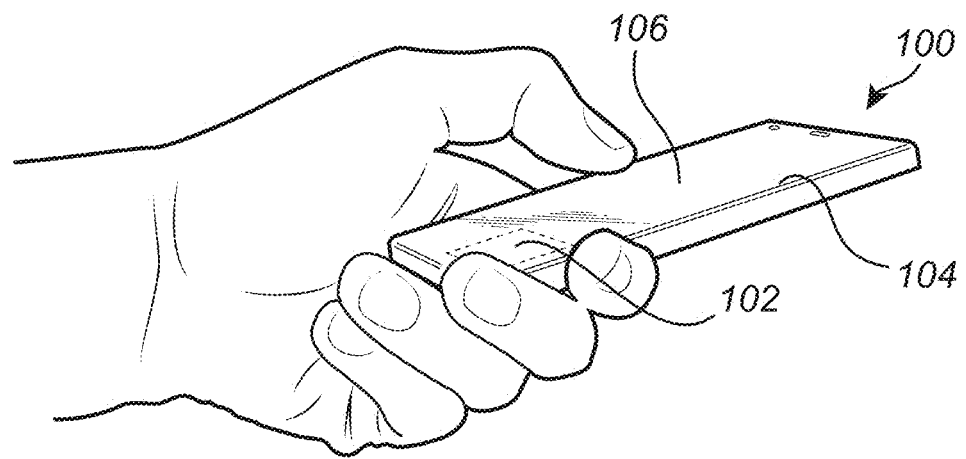
FIG. 1 schematically exemplifies an electronic device according to an embodiment of the present disclosure.

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person. Like reference characters refer to like elements throughout.

Turning now to the drawings and to FIG. 1 in particular, there is schematically illustrated an example of an electronic device configured to apply the concept according to the present disclosure, in the form of a mobile phone 100 with an integrated fingerprint sensor 102 and a display unit 104 with a touch screen interface. In this embodiment the fingerprint sensor 102 is arranged on a front side of the mobile phone 100, where also the display unit 104 is positioned. The fingerprint sensor 102 may, for example, be used for unlocking the mobile phone 100 and/or for authorizing transactions carried out using the mobile phone 100, etc. The fingerprint sensor 102 may of course also be placed on the back or the front side of the mobile phone 100.

Preferably and as is apparent for the skilled person, the mobile phone 100 shown in FIG. 1 further comprises a first antenna for WLAN/Wi-Fi communication, a second antenna for telecommunication communication, a microphone, a speaker, and a phone control unit. Further hardware elements are of course possibly comprised with the mobile phone.

It should furthermore be noted that the invention may be applicable in relation to any other type of electronic devices, such as a laptop, a remote control, a tablet computer, smart card comprising a fingerprint sensor, or any other type of present or future similarly configured device, including any type of IoT devices where there is a desire to allow for user specific settings and/or identification/authentication of a user to be implemented.

In regards to all of the electronic devices as shown in FIG. 1, the fingerprint sensor 102 is arranged in electrical communication with a processing circuitry adapted for controlling the fingerprint sensor 102. The processing circuitry may each include a microprocessor, microcontroller, programmable digital signal processor or another programmable device. The processing circuitry may also, or instead, each includes an application specific integrated circuit, a programmable gate array or programmable array logic, a programmable logic device, or a digital signal processor. Where the processing circuitry includes a programmable device such as the microprocessor, microcontroller or programmable digital signal processor mentioned above, the processor may further include computer executable code that controls operation of the programmable device. It should be understood that all or some parts of the functionality provided by means of the processing circuitry (or generally discussed as "processing circuitry") may be at least partly integrated with the fingerprint sensor 102.

Figure 2:
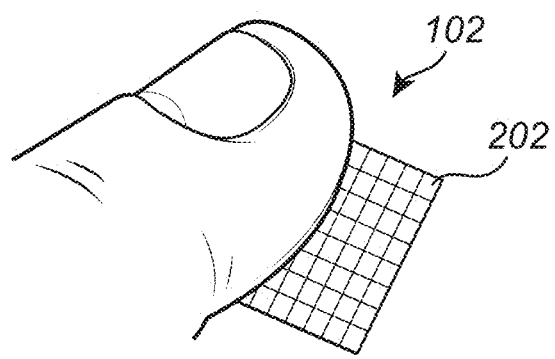
FIG. 2 schematically shows the fingerprint sensor array comprised in the portable electronic device in FIG. 1.

With further reference to FIG. 2, there is conceptually illustrated a somewhat enlarged view of the fingerprint sensor 102. In the case of employing a capacitive sensing technology, the fingerprint sensor 102 is configured to comprise a large plurality of sensing elements, preferably arranged as a two-dimensional array. The two-dimensional array may have sizes depending on the planned implementation and in an embodiment 160×160 pixels are used. Other sizes are of course possible and within the scope of the invention, including two-dimensional array with less pixels as compared to the above example. A single sensing element (also denoted as a pixel) is in FIG. 2 indicated by reference numeral 202.

Figure 3A:
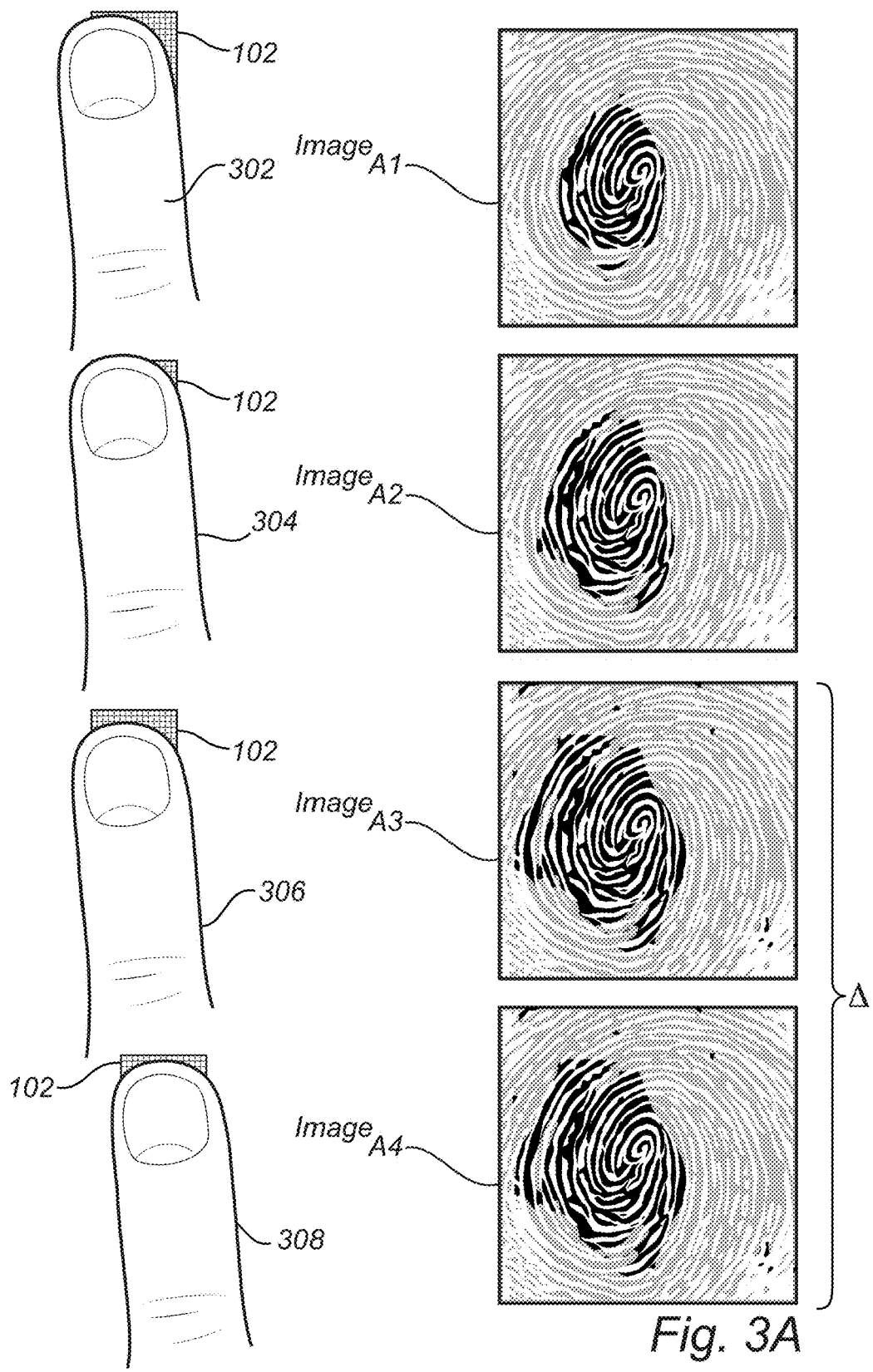
FIGS. 3A-3C conceptually illustrate different user behaviors in relation to an enrollment processes.
Figure 3B:
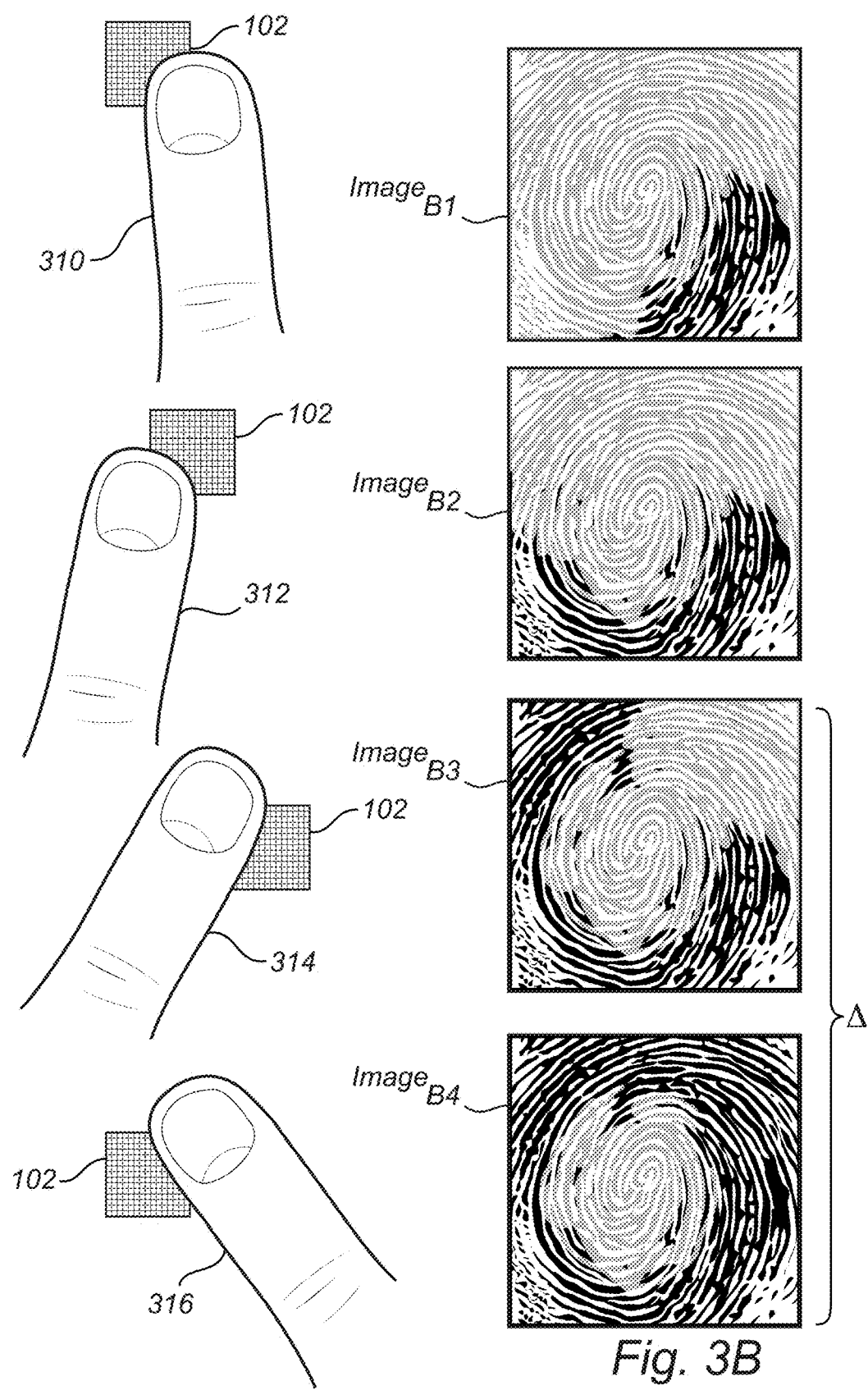
Figure 3C:
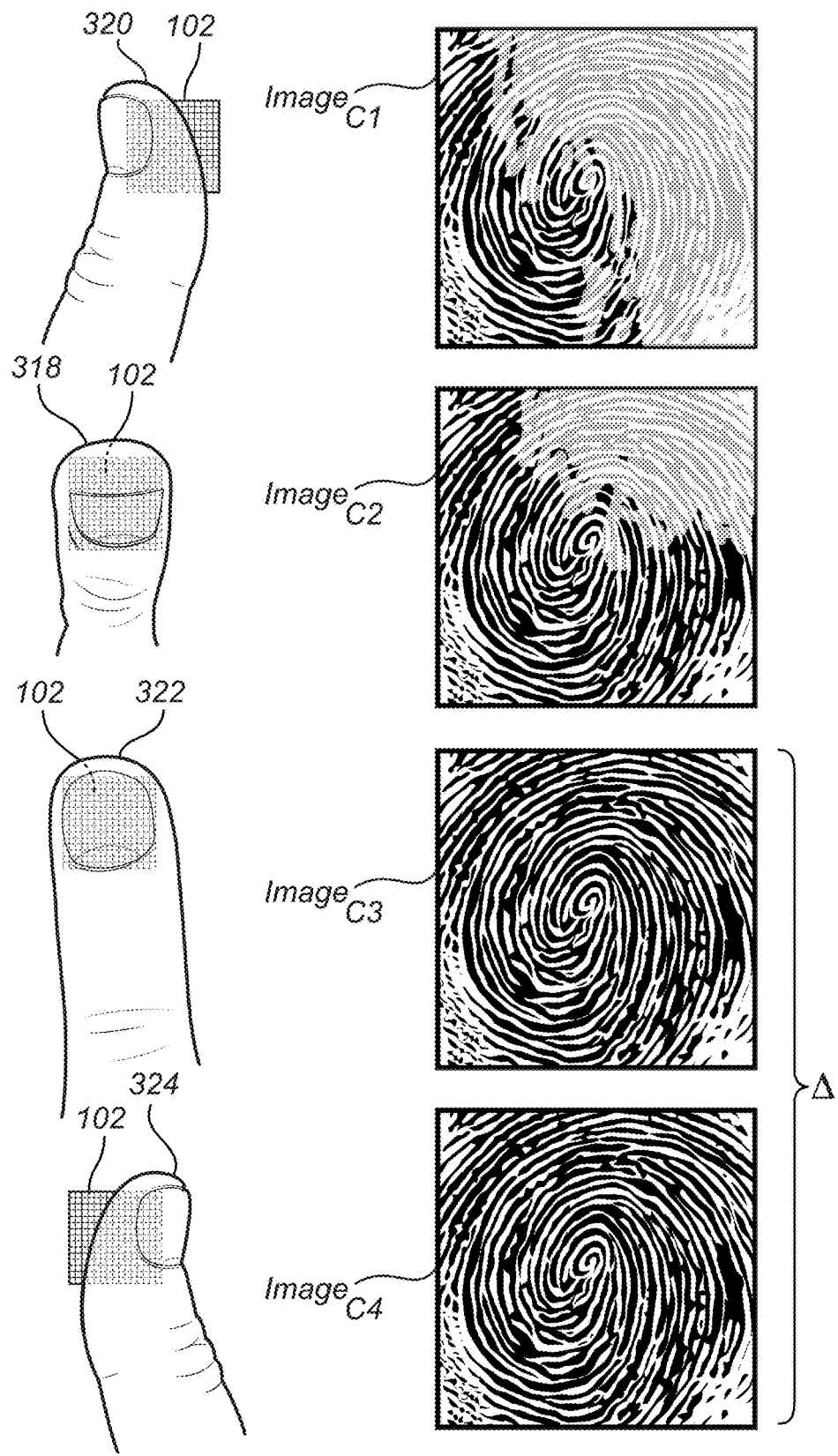

Turning now to FIGS. 3A-3C, providing three examples of user behavior/finger mobility in relation to an enrollment process. In FIG. 3A there is shown a case where the users applies an in comparison low finger displacement activity, specifically by only slightly moving his finger between four consecutive finger placements 302, 304, 306 and 308 on the fingerprint sensor 102 during a first enrollment process, where the four consecutive finger placements 302, 304, 306 and 308 forms a sequence of finger placements. It should of course be understood that the number, i.e. four, is just provided as an example for comparable user behavior in relation to FIGS. 3A-3C. On the right hand side it is illustrated how the collaborative fingerprint image "evolves" between each of the finger placements, from the first finger placement 302 (Image$_{A1}$), the second finger placement 304 (Image$_{A2}$), etc. If comparing the third (Image$_{A3}$) and the fourth (Image$_{A4}$) it is seen that the difference, $\Delta$, is relatively small. This consequently means that the change in the total coverage area is relatively low. In accordance to an embodiment of the present disclosure, the enrollment process will complete if the finger displacement activity is high and there is a low change in total coverage area. The example shown in FIG. 3A will thus not directly result in a completion of the enrollment process already after the four consecutive finger placements 302, 304, 306 and 308 on the fingerprint sensor 102.

In FIG. 3B there is shown a different user behavior, namely a situation where the user is "highly active" in his repositioning between four consecutive finger placements 310, 312, 314 and 316 on the fingerprint sensor 102 during a second enrollment process. As may be seen, the user moves his finger in such a manner that only small image portions of the finger are acquired with each of the finger placements 310, 312, 314 and 316. In a similar manner as discussed in relation to FIG. 3A, there is in FIG. 3B on the right hand side illustrated how the collaborative fingerprint image "evolves" between each of the finger placements, from the first finger placement 310 (Image$_{B1}$), the second finger placement 312 (Image$_{B2}$), etc. If comparing the third (Image$_{B3}$) and the fourth (Image$_{B4}$) it is seen that the difference, Δ, is relatively high. This consequently means that the change in the total coverage area relatively high, typically meaning that there still exists uncaptured parts of the finger, and that there still is a relatively large change in the total coverage area. As stated above, in an embodiment of the present disclosure, the enrollment process will complete if the finger displacement activity is high and there is a low change in total coverage area. The example shown in FIG. 3B will thus not directly fulfill this requirement already after the four consecutive finger placements 310, 312, 314 and 316 on the fingerprint sensor 102.

In FIG. 3C, there is shown a further different user behavior, namely a situation where it is determined that the user is active (high) in his repositioning between four consecutive finger placements 318, 320, 322, 324 on the fingerprint sensor 102 during a third enrollment process. As may be seen, the user repositions his finger in a "smart" way in relation to the fingerprint sensor, such that four separate views of the finger may be acquired, where the resulting collaborative fingerprint image (from Image$_{C1}$ to Image$_{C3}$) relating to the total coverage area, evolves for each of the first three finger placements 318, 320 and 322 on the fingerprint sensor 102. Once the user touches/contacts the fingerprint sensor the fourth time, 324, the difference in total coverage area, Δ, is determined to be relatively low. In accordance to the above discussion, the enrollment process may in such a case be completed, i.e. the requirements according to an embodiment of the present disclosure are fulfilled. As understood from the above, when the user enrolls a finger in accordance to the user behavior as is illustrated in FIG. 3C, the user has to touch the fingerprint sensor 102 less times as compared to when applying the behaviors as are illustrated in FIGS. 3A and 3B, for acquiring the same amount of fingerprint data relating to the finger of the user. As previously discussed, a sufficient amount of fingerprint data is typically needed for forming a fingerprint template that subsequently in a successful way may be used in an authentication process. Accordingly, the present disclosure in essence identifies what kind of behavior the user applies during enrollment and adapts the enrollment procedure accordingly, where a user behavior as for example shown in FIG. 3C will result in the possibility for the user to finish enrollment with fewer fingerprint sensor touches as compared to user behaviors as exemplified in FIGS. 3A and 3B. Specifically, the present disclosure monitors the change in total template coverage area as well as finger mobility.

If the user is not actively moving around the finger, such as is exemplified in FIG. 3A, it is not possible to know whether there is more fingerprint area to cover or not, and enrollment will continue until maximum number of touches is reached, such as for example 10 times of the user touching the fingerprint sensor 102. If on the other hand the user actively moves the finger around between touches, such as is exemplified in FIG. 3C, the enrollment will preferably only continue as long as total enrolled template area is still showing a change being above the second threshold (typically meaning that the enrollment process will continue as long as there is a significant increase in the total coverage area). When total enrolled template area is no longer changing/increasing and it can be determined that it is not because the finger is immobile between touches, the enrollment process is completed.

The enrollment flow according to the present disclosure may possibly be implemented in a step by step manner as is described below, wherein for each touch n between $n_{start}$ and $n_{max}$:

1. Estimate currently enrolled total template coverage area, $A_n$.
2. Estimate change, do in total template coverage area compared to previous touch, n−1.
3. Determine the ratio, $R1_n$, between a weighted average of previous changes in total template coverage and $A_n$.
4. Estimate mobility, $m_n$, of current touch, n, from the translation between the center of current touch and the previous touch, n−1.
5. Determine the ratio, $R2_n$, between a weighted average of previous mobility estimates and a function of $A_n$.
6. Finish enrollment process if either $n > n_{max}$ or if $R2_n > R2_{threshold}$, $R1_n < R1_{threshold}$, $A_n > A_{threshold}$, and $n > n_{min}$.

R1 and R2 may be calculated as:

$$R1_n = \frac{\sum_{k=0}^{k\_max} \alpha_k \cdot d_{n-k}}{A_n \cdot \sum_{k=0}^{k\_max} \alpha_k} = \frac{\sum_{k=0}^{k\_max} \alpha_k \cdot (A_{n-k} - A_{n-k-1})}{A_n \cdot \sum_{k=0}^{k\_max} \alpha_k}$$

$$R2_n = \frac{\sum_{k=0}^{k\_max} \beta_k \cdot m_{n-k}}{\sqrt{A_n} \cdot \sum_{k=0}^{k\_max} \beta_k}$$

Figure 4:
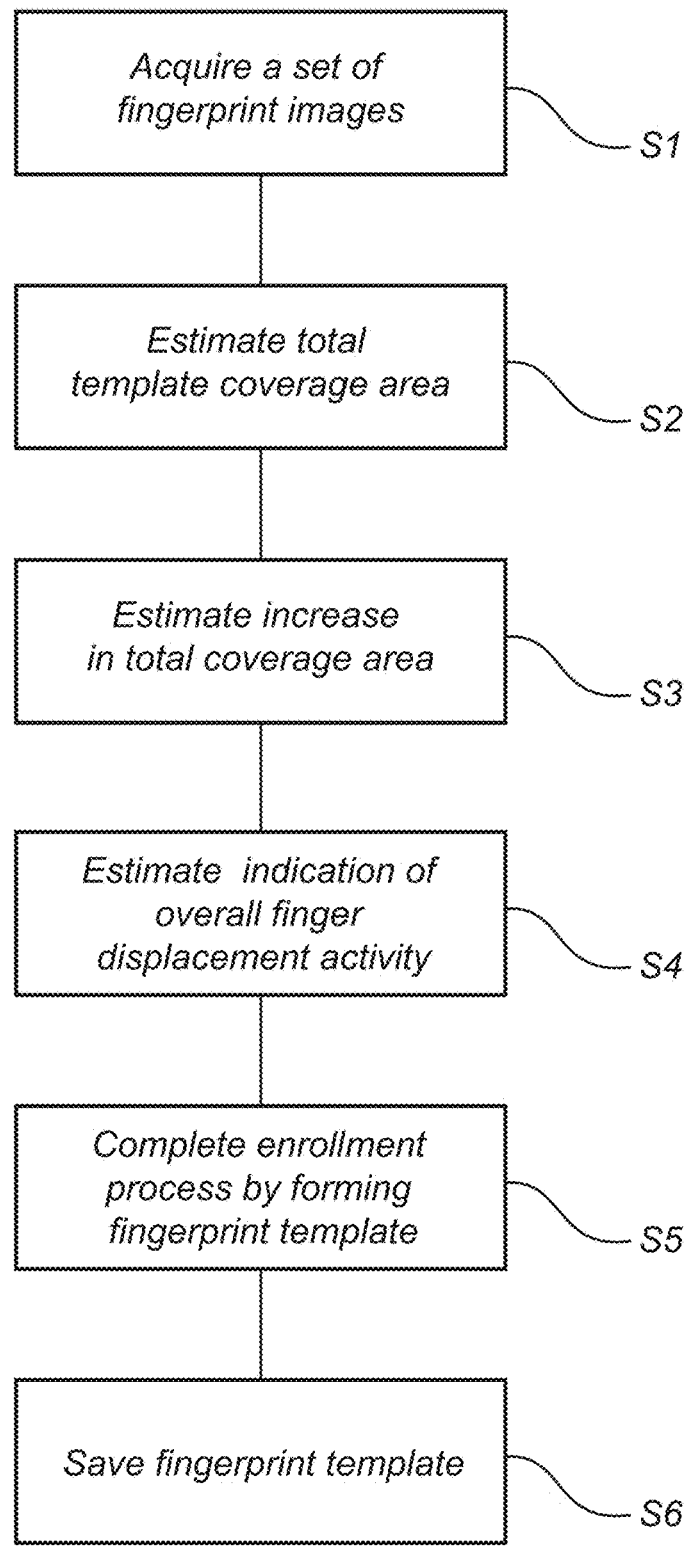
FIG. 4 is a flowchart disclosing the exemplary steps of the present disclosure.

In summary and as shown in FIG. 4, the present disclosure relates to a method of enrolling a fingerprint of a user's finger, by means of an electronic device 100 comprising a fingerprint sensor 102 having an active area, comprising acquiring, S1, from the fingerprint sensor 102, for each finger placement in a sequence of finger placements on the fingerprint sensor 102 during an enrollment process 318, 320, 322, 324, a fingerprint image of a portion of the fingerprint. The process continues by estimating, S2, based on the fingerprint images acquired for the finger placements in the sequence of finger placements, a total template coverage area, and subsequently estimating, S3, for each finger placement in said sequence of finger placements on the fingerprint sensor 102, an change in the total coverage area. The method also comprises estimating, S4, based on the fingerprint images acquired for the finger placements in the sequence of finger placements, an indication of an overall finger displacement activity by the user within the active area of the fingerprint sensor.

It should furthermore be understood that the concept according to the invention also may be used for penalizing users that do not e.g. reposition their finger enough between consecutive finger placements. That is, such users may be required to contact/touch the fingerprint sensor a further number of times until the sufficient surface area of the finger has been captured.

The enrollment process is completed, S5, by forming a fingerprint template based on said acquired fingerprint images, wherein completion of the enrollment process is dependent on the overall finger displacement activity and the change in the total coverage area. Once the enrollment process is completed, the fingerprint template is saved, S6, together with an identifier for the fingerprint to thereby enroll the fingerprint of the user's finger. The present disclosure provides a solution that allows for a reduction in the number of times the user's finger, in some situations, needs to contact the fingerprint sensor 102 for enrollment completion.

The control functionality of the present disclosure may be implemented using existing computer processors, or by a special purpose computer processor for an appropriate system, incorporated for this or another purpose, or by a hardwire system. Embodiments within the scope of the present disclosure include program products comprising machine-readable medium for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a sequence the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps. Additionally, even though the invention has been described with reference to specific exemplifying embodiments thereof, many different alterations, modifications and the like will become apparent for those skilled in the art.

In addition, variations to the disclosed embodiments can be understood and effected by the skilled addressee in practicing the claimed invention, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A method of enrolling a fingerprint of a user's finger, by means of an electronic device comprising a fingerprint sensor having an active area, the method comprising:
   acquiring, from the fingerprint sensor, for each finger placement in a sequence of finger placements on the fingerprint sensor during an enrollment process, a fingerprint image of a portion of the fingerprint;
   determining, based on the fingerprint images acquired for the finger placements in the sequence of finger placements, a total template coverage area,
   determining, for each finger placement in said sequence of finger placements on said fingerprint sensor, a change in the total coverage area;
   determining, based on the fingerprint images acquired for the finger placements in the sequence of finger placements, an indication of an overall finger displacement activity by the user within the active area of the fingerprint sensor;
   completing the enrollment process by forming a fingerprint template based on said acquired fingerprint images, wherein the enrollment process and the acquisition of further fingerprint images is completed if the overall finger displacement activity is determined to be above a first threshold and the change in the total coverage area is determined to be below a second threshold, and
   saving the fingerprint template together with an identifier for the fingerprint to thereby enrolling the fingerprint of the user's finger.

2. The method according to claim 1, wherein completion of the enrollment process is further dependent on at least one of a size and a shape of the active area of the sensor.

3. The method according to claim 1, wherein at least one of the first and the second threshold is dependent on at least one of a size and a shape of the active area of the sensor.

4. The method according to claim 1, wherein the estimation of the change in the total coverage area is performed for each consecutive finger placement in said sequence of finger placements on said fingerprint sensor.

5. The method according to claim 1, wherein the step of estimating the indication of an overall finger displacement activity by the user comprises the step of:
   estimating a distance between a center of touch for two consecutively acquired fingerprint images in said sequence of finger placements on said fingerprint sensor.

6. The method according to claim 5, further comprising the step of:
   determining a relationship between the estimated distance and the total coverage area.

7. The method according to claim 1, wherein the enrollment process is completed if the number of finger placements on the fingerprint sensor during the enrollment process is above a third threshold.

8. An electronic device adapted for enrolling a fingerprint of a user's finger, the electronic device comprising:
   a fingerprint sensor having an active area, and
   processing circuitry,
   wherein the processing circuitry is adapted to:
     acquire, from the fingerprint sensor, for each finger placement in a sequence of finger placements on the fingerprint sensor during an enrollment process, a fingerprint image of a portion of the fingerprint;
     determine, based on the fingerprint images acquired for the finger placements in the sequence of finger placements, a total template coverage area,
     determine, for each finger placement in said sequence of finger placements on said fingerprint sensor, a change in the total coverage area;
     determine, based on the fingerprint images acquired for the finger placements in the sequence of finger placements, an indication of an overall finger displacement activity by the user within the active area of the fingerprint sensor;
     complete the enrollment process by forming a fingerprint template based on said acquired fingerprint images, wherein the enrollment process and the acquisition of further fingerprint images is completed if the overall finger displacement activity is determined to be above a first threshold and the change in the total coverage area is determined to be below a second threshold; and save the fingerprint template together with an identifier for the fingerprint to thereby enrolling the fingerprint of the user's finger.

9. The electronic device according to claim 8, wherein completion of the enrollment process is further dependent on at least one of a size and a shape of the active area of the sensor.

10. The electronic device according to claim 9, wherein at least one of the first and the second threshold is dependent on at least one of a size and a shape of the active area of the sensor.

11. The electronic device according to claim 8, wherein the processing circuitry is integrated with the fingerprint sensor.

12. The electronic device according to claim 8, wherein the fingerprint sensor is a capacitive fingerprint sensor.

13. The electronic device according to claim 8, wherein the fingerprint sensor is a combined capacitive and ultrasound fingerprint sensor.

14. The electronic device according to claim 8, wherein the electronic device is a mobile phone.

15. A computer program product comprising a non-transitory computer readable medium having stored thereon computer program means for operating an electronic device adapted for enrolling a fingerprint of a user's finger, the electronic device comprising:

a fingerprint sensor having an active area, and processing circuitry, wherein the computer program product comprises:

code for acquiring, from the fingerprint sensor, for each finger placement in a sequence of finger placements on the fingerprint sensor during an enrollment process, a fingerprint image of a portion of the fingerprint;

code for determining, based on the fingerprint images acquired for the finger placements in the sequence of finger placements, a total template coverage area;

code for determining, for each finger placement in said sequence of finger placements on said fingerprint sensor, a change in the total coverage area;

code for determining, based on the fingerprint images acquired for the finger placements in the sequence of finger placements, an indication of an overall finger displacement activity by the user within the active area of the fingerprint sensor;

code for completing the enrollment process by forming a fingerprint template based on said acquired fingerprint images, wherein the enrollment process and the acquisition of further fingerprint images is completed if the overall finger displacement activity is determined to be above a first threshold and the change in the total coverage area is determined to be below a second threshold; and code for saving the fingerprint template together with an identifier for the fingerprint to thereby enrolling the fingerprint of the user's finger.

* * * * *